United States Patent
McDevitt et al.

(10) Patent No.: US 12,432,134 B1
(45) Date of Patent: Sep. 30, 2025

(54) ENABLING MULTICAST DOMAIN NAME SERVICES FUNCTIONALITY FOR CONTENT CREATION DEVICES INTERFACING WITH CLOUD-HOSTED SOFTWARE

(71) Applicant: Amazon Technologies, Inc., Seattle, WA (US)

(72) Inventors: Michael Allen McDevitt, Camarillo, CA (US); David Ginsberg, Chino Hills, CA (US)

(73) Assignee: Amazon Technologies, Inc., Seattle, WA (US)

( * ) Notice: Subject to any disclaimer, the term of this patent is extended or adjusted under 35 U.S.C. 154(b) by 375 days.

(21) Appl. No.: 18/194,416

(22) Filed: Mar. 31, 2023

(51) Int. Cl.
  *H04L 45/00*  (2022.01)
  *H04L 12/46*  (2006.01)
  *H04L 45/76*  (2022.01)
  *H04L 61/4511*  (2022.01)

(52) U.S. Cl.
  CPC .......... *H04L 45/14* (2013.01); *H04L 12/4641* (2013.01); *H04L 45/76* (2022.05); *H04L 61/4511* (2022.05)

(58) Field of Classification Search
  CPC ..... H04L 45/14; H04L 12/4641; H04L 45/76; H04L 61/4511
  See application file for complete search history.

(56) References Cited

U.S. PATENT DOCUMENTS

| | | | |
|---|---|---|---|
| 2020/0412608 A1* | 12/2020 | Dunbar | H04L 67/141 |
| 2021/0168034 A1* | 6/2021 | Qian | H04L 41/22 |
| 2021/0168036 A1* | 6/2021 | Qian | H04L 41/5003 |

* cited by examiner

*Primary Examiner* — Cheikh T Ndiaye
(74) *Attorney, Agent, or Firm* — Nicholson DeVos Webster & Elliott LLP

(57) ABSTRACT

Techniques are described for enabling content creation devices in a user's on-premises environment to establish a network connection with and to communicate with content creation software running on a remote server in its own virtual private cloud of a cloud provider. One or more services of a cloud provider network provide automated processes and resources for facilitating such connections. For example, a user or application can request to establish a network connection between an on-premises peripheral device and content creation software running on computing resources provisioned by the cloud provider network. The cloud provider network can then launch and configure a virtual router with appropriate tunneling configurations for routing network traffic originating from the peripheral device to the instance. The service can further provide configuration data, configuration scripts, or other data that can be used to configure a tunnel at a local router to which the peripheral device is attached.

20 Claims, 8 Drawing Sheets

ENABLING MULTICAST DOMAIN NAME SERVICES FUNCTIONALITY FOR CONTENT CREATION DEVICES INTERFACING WITH CLOUD-HOSTED SOFTWARE

BACKGROUND

Content creation devices include hardware and software tools that enable users to capture, create, and edit audiovisual content. These devices can include, for example, audio interfaces that allow users to record and playback audio signals from microphones, instruments, and other sources; video interfaces used to capture and output video signals from cameras, monitors, and the like; and control surfaces that provide physical controls for adjusting parameters in content creation software. Some such content creation devices are used in association with content creation software used to capture audiovisual content from content creation devices, to manage and edit audiovisual content based in part on input from content creation devices, among other features.

BRIEF DESCRIPTION OF DRAWINGS

Various examples in accordance with the present disclosure will be described with reference to the drawings, in which.

DETAILED DESCRIPTION

Figure 1:
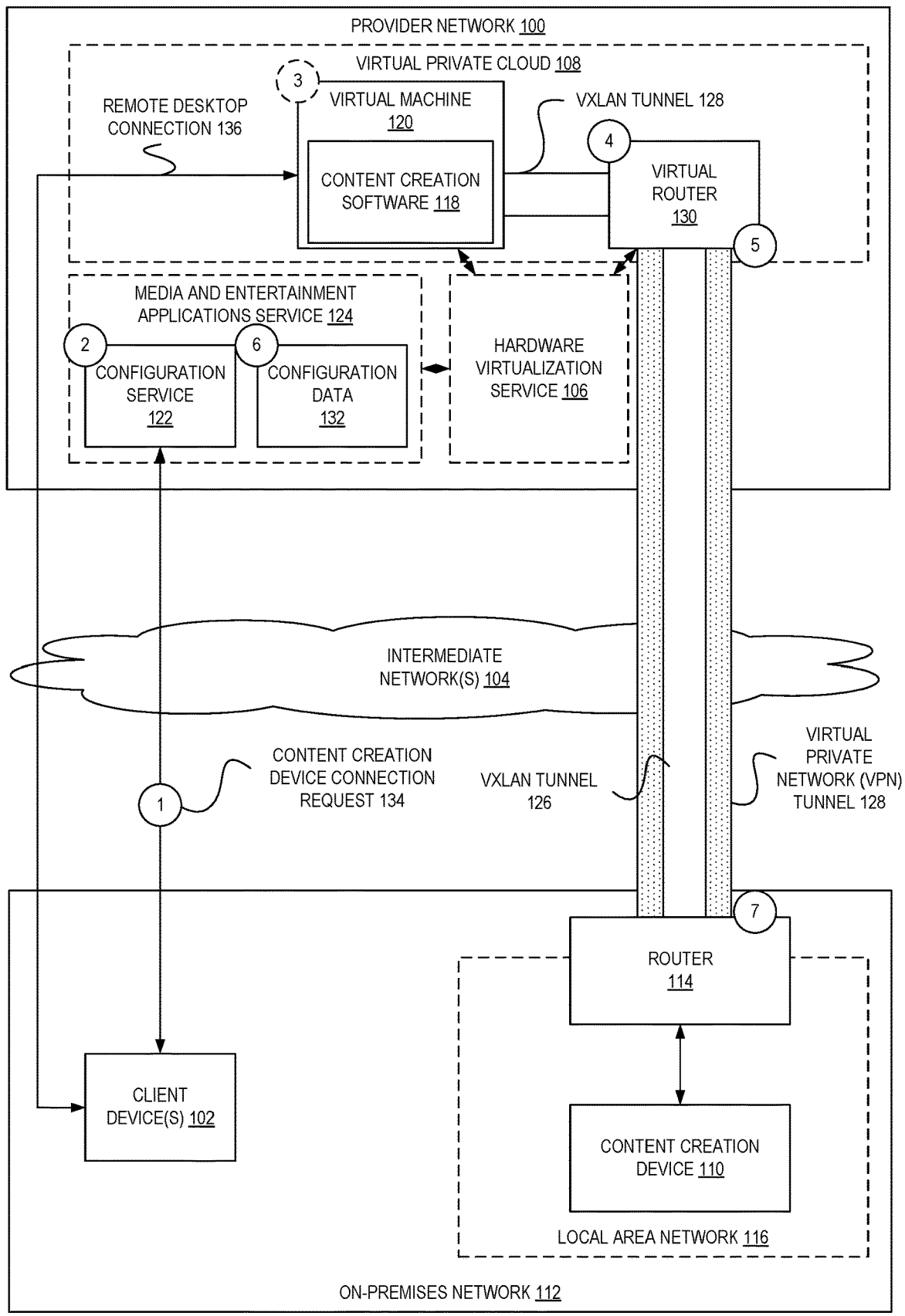
FIG. 1 is a diagram illustrating an environment for enabling content creation devices running in a local computer network to establish a connection with content creation software running on computing resources provided by a cloud provider network according to some examples.

The present disclosure relates to methods, apparatus, systems, and non-transitory computer-readable storage media for enabling content creation devices (e.g., audio interfaces, video interfaces, control surfaces, etc.) on a local Internet Protocol (IP) subnet range (e.g., a virtual local area network (VLAN) associated with a user's on-premises environment) to establish a network connection with and to communicate with content creation software running on a remote server in its own virtual private cloud (VPC). According to some examples, one or more services of a cloud provider network provide automated processes and resources for facilitating such connections. For example, a user or application can request to establish a network connection between an on-premises peripheral device and content creation software running on computing resources (e.g., a virtual machine) provisioned by the cloud provider network. The cloud provider network can then launch and configure a virtual router with appropriate tunneling configurations for routing network traffic originating from the peripheral device to the instance. The service can further provide configuration data, configuration scripts, or other data that can be used to configure one or more tunnels at a local router to which the peripheral device is attached. Among other benefits described herein, these automated processes enable users to readily establish secure, low latency connections between their on-premises peripheral devices and cloud-hosted content creation software, thereby enabling the use of such peripheral devices at virtually any location with internet connectivity.

Professionals in fields such as film, television, music, and gaming use content creation software to create, edit, and deliver various types of audiovisual content. For many professionals, the use of such software further involves the use of content creation devices, such as audio interfaces (e.g., to record and playback audio signals), video interfaces (e.g., to capture and output video signals from cameras, monitors, or other sources), control surfaces (e.g., devices including faders, knobs, buttons, jog wheels, touchscreens, and other interfaces for controlling the use of content creation software). These devices broadly enable users to capture audio and video, to control various parameters and functions of content creation software, and to perform other actions to enhance their productivity, accuracy, and expression during the content creation process.

Typically, these and other types of content creation devices are designed to interface with content creation software running on a server on a same local area network (e.g., a server connected to a same physical hardware switch as the content creation devices). As part of an initial setup process, many such devices thus use multicast Domain Name Services (mDNS) to discover a local server running software relevant to the devices' operation and to perform an initial handshake with the content creation software. The mDNS protocol, for example, typically is used to allow devices on a local network to discover and communicate with each other without the need for a central server or manual configuration. The protocol enables devices to use multicast DNS messages to announce and query for services and names on the network and is widely used by content creation devices, among other types of devices.

Many users of content creation software desire the ability to make use of computing resources provided by cloud provider networks to host content creation software. For example, the use of computing resources provided by a cloud provider network can alleviate users from the need to acquire, configure, and maintain their own computing hardware to host the content creation software. Furthermore, cloud-based computing resources can provide more computing resources to host resource-intensive content creation software processes, can enable collaboration among users located in different locations, among other possible benefits. However, the mDNS techniques used by a content creation device to discover its associated content creation software hosted on a local network generally do not work when the content creation software is hosted on a remote network, e.g., across one or more public networks such as the Internet.

These challenges, among others, are addressed by the techniques described herein for enabling content creation devices running on local computer networks to establish connections with content creation software running on computing resources provided by a cloud provider network. The automated configuration processes described herein allow users to readily use FIG. 1 is a diagram illustrating an environment for enabling content creation devices running in a local computer network to establish a connection with content creation software running on computing resources provided by a cloud provider network according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use electronic device(s) (e.g., a client device 102) and one or more user accounts that are associated with a customer account, though these terms can be used somewhat interchangeably depending upon the context of use. Users can interact with a provider network 100 across one or more intermediate networks 104 (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a geographical area in which the cloud provider clusters data centers. Each region includes multiple (e.g., two or more) availability zones (AZs) connected to one another via a private high-speed network, for example a fiber communication connection. An AZ (also known as a "zone") provides an isolated failure domain including one or more data center facilities with separate power, separate networking, and separate cooling from those in another AZ. A data center refers to a physical building or enclosure that houses and provides power and cooling to servers of the cloud provider network. Preferably, AZs within a region are positioned far enough away from one another so that a natural disaster (or other failure-inducing event) should not affect or take more than one AZ offline at the same time.

Users can connect to an AZ of the cloud provider network via a publicly accessible network (e.g., the Internet, a cellular communication network), e.g., by way of a transit center (TC). TCs are the primary backbone locations linking users to the cloud provider network and can be collocated at other network provider facilities (e.g., Internet service providers (ISPs), telecommunications providers) and securely connected (e.g., via a VPN or direct connection) to the AZs. Each region can operate two or more TCs for redundancy. Regions are connected to a global network which includes private networking infrastructure (e.g., fiber connections controlled by the cloud provider) connecting each region to at least one other region. The cloud provider network can deliver content from points of presence (or "POPs") outside of, but networked with, these regions by way of edge locations and regional edge cache servers. This compartmentalization and geographic distribution of computing hardware enables the cloud provider network to provide low-latency resource access to users on a global scale with a high degree of fault tolerance and stability.

Generally, the traffic and operations of a provider network can broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes user resources that are implemented on the provider network (e.g., computing instances, containers, block storage volumes, databases, file storage). Data plane traffic generally includes non-administrative operations, such as transferring user data to and from the user resources. The control plane components are typically implemented on a separate set of servers from the data plane servers, and control plane traffic and data plane traffic can be sent over separate/distinct networks.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, an on-demand code execution service, a hardware virtualization service, a container service, or the like.

An on-demand code execution service (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service by uploading their code and use one or more APIs to request that the service identify, provision, and manage any resources required to run the code. Thus, in various examples, a "serverless" function can include code provided by a user or other entity—such as the provider network itself—that can be executed on demand. Serverless functions can be maintained within the provider network by an on-demand code execution service and can be associated with a particular user or account or can be generally accessible to multiple users/accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near real-time.

A hardware virtualization service 106 (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

A virtual private cloud (VPC) (also referred to as a virtual network (VNet), virtual private network, or virtual cloud network, in various implementations) is a custom-defined, virtual network within another network, such as a cloud provider network. In FIG. 1, the virtual private cloud 108 is an example of a VPC. A VPC can be defined by at least its address space, internal structure (e.g., the computing resources that comprise the VPC, security groups), and transit paths, and is logically isolated from other virtual networks in the cloud. A VPC can span all the availability zones in a particular region.

A VPC can provide the foundational network layer for a cloud service, for example a compute cloud or an edge cloud, or for a customer application or workload that runs on the cloud. A VPC can be dedicated to a particular customer account (or set of related customer accounts, such as different customer accounts belonging to the same business organization). Customers can launch resources, such as compute instances, into their VPC(s). When creating a VPC, a customer can specify a range of IP addresses for the VPC in the form of a Classless Inter-Domain Routing (CIDR) block. After creating a VPC, a customer can add one or more subnets in each availability zone or edge location associated with its region.

As indicated, it may often be desirable for users having content creation devices (e.g., a content creation device 110) in their on-premises network 112 (e.g., connected to a local router 114 and part of a local area network 116) to interface with content creation software 118 running on computing resources provisioned within a VPC 108 of a provider network (e.g., a virtual machine 120). As indicated, the content creation software can broadly include any type of software used in conjunction with one or more types of content creation devices 110 to create, edit, or otherwise produce audiovisual content. As indicated, many types of content creation devices 110 use mDNS to discover content creation software, where such discovery-based network traffic generally cannot be routed from an on-premises network 112 across one or more intermediate network(s) 104 without additional configurations. As described in more detail hereinafter, a process is described in which a configuration service 122 of a media and entertainment applications service 124 automates processes involved in establishing a secure and low-latency network tunnel (including, e.g., a VXLAN tunnel 126 running over a VPN tunnel 128) between a user's on-premises router 114 and a virtual router 130 running a VPC 108 and providing connectivity to a virtual machine 120 running content creation software 118. In some examples, the processes can further include generating configuration data 132 (e.g., including configuration files, scripts, or other related data) used to configure a router 114 in the on-premises network 112. Once established, the VXLAN/VPN tunnel including the VXLAN tunnel 126 and VPN tunnel 128 enables multicast-related network traffic to traverse the VXLAN/VPN tunnel to the content creation software 118 in a secure and low-latency manner, thereby enabling content creation devices 110 to readily interface with such software from virtually any internet-connected location.

In FIG. 1, at circle "1," a client device 102 sends a content creation device connection request 134 to establish a connection between a content creation device 110 and content creation software 118 running in a virtual private cloud 108 of the provider network 100. The request 134 can be generated, for example, by a user associated with the content creation device 110 and who desires to use the device in conjunction with content creation software 118 hosted by, or to be hosted by, computing resources provided by the provider network 100. In some examples, the request can be generated via a web-based console, command-line interface (CLI), API request, etc. The request 134 can include some or all the following information: an identifier of a type of content creation device 110, an identifier of a type of router 114 to which the content creation device 110 is connected in the on-premises network 112, addressing information associated with the router 114 (e.g., an external IP address assigned to the router, an identifier of a subnet range in the local area network 116, etc.), an identifier of the virtual private cloud 108 to which a connection is desired, an identifier of a virtual machine 120 or other computing resource hosting the content creation software 118 to which a connection is desired, among other possible information. As shown, a client device 102 can also be used to connect to a virtual machine 120 to use content creation software 118 in association with a content creation device 110. For example, a user can operate the virtual machine and content creation software using any type of remote desktop connection 136 (e.g., NICE Desktop Cloud Visualization (DCV), Remote Desktop Services (RDS), etc.) supported by the virtual machine 120. In this manner, a user associated with a content creation device 110 can see the output of using the content creation device 110 in their on-premises network 112 in real-time via the content creation software 118.

At circle "2," a media and entertainment applications service 124 (or any other service of the cloud provider network 100) receives and processes the request 134. For example, a configuration service 122 or other component of the media and entertainment applications service 124 can authenticate a user generating the request and determine whether a user account associated with the request has permissions to request establishment of the requested connection. The configuration service 122 can further log receipt of the request, validate any parameters provided with the request, among other possible processes.

At circle "3," if it has not already been launched, the configuration service 122 optionally launches a virtual machine 120 or other computing resource to be used to host the content creation software 118. For example, the request 134 can indicate that it is desired for a new instance of the content creation software 118 to be launched in a user's identified VPC 108, and the configuration service 122 can use a machine image or other processes to launch a new instance.

At circle "4," the configuration service 122 uses a machine image or other process to launch and configure a virtual router 130 into the VPC 108. In some examples, the configuration service 122 launches the virtual router 130 into a same subnet as the one including the virtual machine 120 or other computing resource to be used to host the content creation software 118. In some examples, the configuration service 122 can launch the virtual router 130 and optional VM 120 individually or can use a template supported by a provisioning and management service of the cloud provider network 100 to automate the creation of those resources.

At circle "5," the configuration service 122 configures a virtual private network (VPN) tunnel 128 endpoint at the virtual router 130 used to establish a connection between the router 114 and the virtual router 130. Broadly, the VPN tunnel 128 in connection with the VXLAN tunnel 126 enables devices connected to the router 114 to communicate with devices connected to the virtual router 130 as if they were on the same local link (e.g., connected to a same physical router), even though the devices are on different network segments entirely. In some examples, a secure VPN tunnel can be used, such as one based on the WireGuard® protocol, where the secure VPN tunnel uses public key cryptography to authenticate devices and to encrypt traffic traversing the tunnel.

In some examples, the creation of the VPN tunnel 128 thus includes the generation of a public key of a public/ private key pair, where the public key is later used as part of configuration of the tunnel at the router 114. For example, the configuration service 122 can provide to a user, or to the router 114 directly, a copy of the public key to be used to setup the other end of the secure VPN tunnel 128 at the on-premises router 114. In some examples, the configuration service 122 provides a configuration file, script, process, or other tool that can be used to configure the secure VPN tunnel at the router 114, including providing the router 114 with the public key, an IP address of the virtual router 130, other connection settings (e.g., an endpoint port, keepalive parameter, etc.), among other possible configurations. In some examples, a vendor associated with a router 114 can support a scripting language or other configuration file input mechanism that enables automated configuration of the router based on a configuration specification, where such support can be used by the configuration service 122 to generate the configuration data 132. In some examples, configuration of the router 114 and virtual router 130 further includes assigning IP addresses to the secure VPN tunnel 128 interfaces, such that the IP addresses do not conflict with other devices in the networks supported by the router 114 and virtual router 130. These addresses can then be configured on each side of the tunnel (e.g., at router 114 and virtual router 130) as allowed addresses such that traffic from each of the routers is permitted at the other router.

In some examples, the configuration service 122 further configures firewall rules associated with the virtual private cloud 108 to ensure that network traffic can pass between the on-premises router 114 and the virtual router 130, and can optionally further confirm that a route is created. In some examples, the media and entertainment applications service 124 optionally disables any reverse path forwarding (RPF) options enabled for the virtual private cloud 108 that might cause network traffic sent to or from the virtual private cloud 108 to be dropped.

In some examples, at circle "6," the configuration service 122 generates configuration data 132 to be used to configure tunnel endpoints at the on-premises router 114. For example, the configuration data 132 can be used to create a VPN tunnel 128 endpoint and a VXLAN tunnel 126 endpoint at the on-premises router 114. As indicated, a VXLAN tunnel is a type of virtual network tunnel that allows for the creation of logical networks that span multiple physical networks. In particular, a VXLAN tunnel uses the VXLAN protocol to encapsulate and decapsulate Ethernet frames over an IP network and uses an identifier, called a VXLAN Network Identifier (VNI), to route traffic. A VXLAN tunnel uses UDP as the transport protocol and adds a VXLAN header, which contains the VNI, to Ethernet frames before sending the frames over the IP network.

In some examples, the configuration service 122 configures the virtual machine 120 for VXLAN functionality. The configuration of the virtual machine 120 can include, for example, disabling any firewall rules that might prevent network traffic from traversing the VXLAN link, adding a loopback interface to the virtual machine, among other possible configurations.

Figure 2:
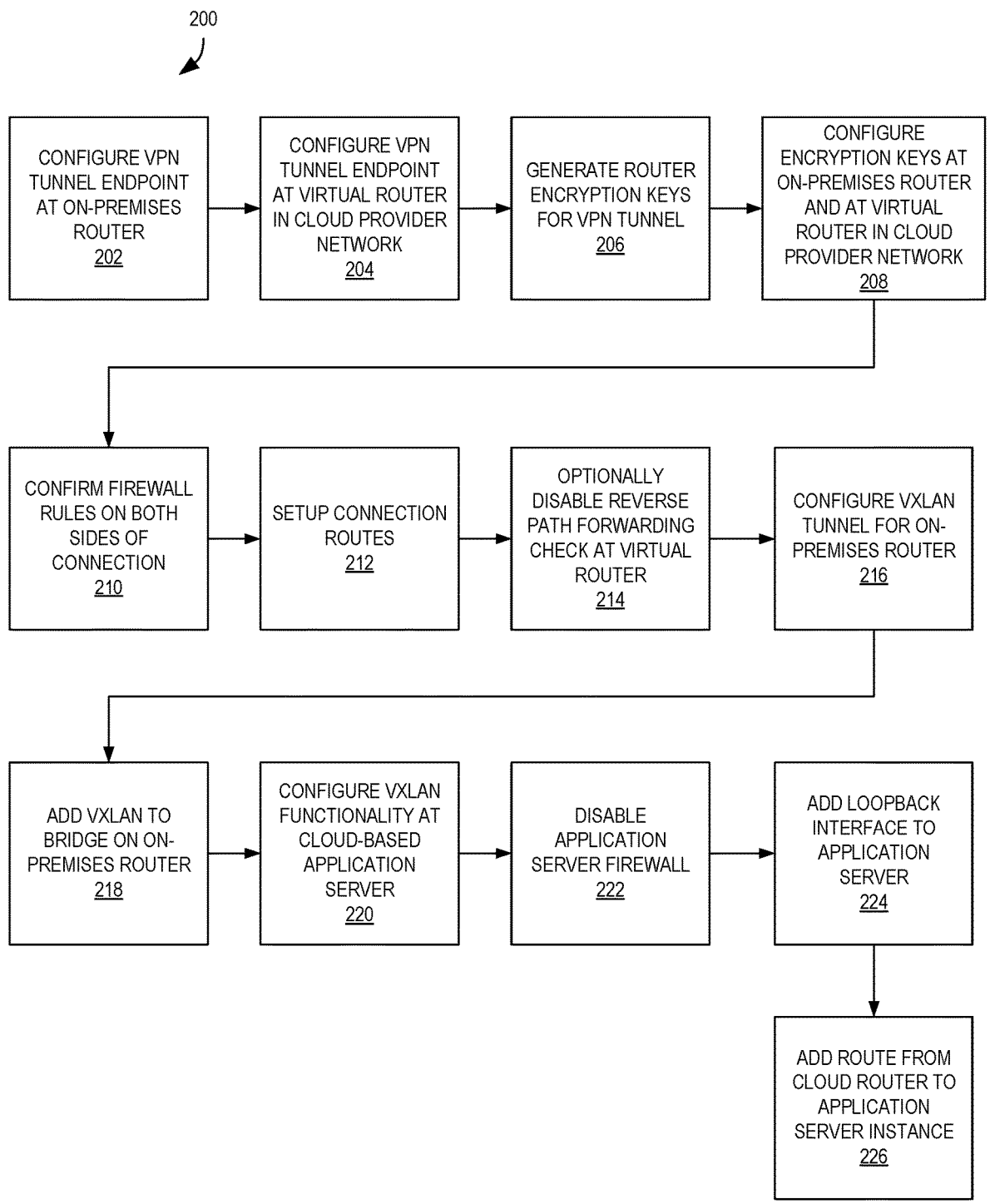
FIG. 2 is a diagram illustrating a workflow for configuring an on-premises router, a virtual router, and an application server running in a virtual private cloud of a cloud provider network to establish a virtual private network (VPN) tunnel and a virtual eXtensible local area network (VXLAN) tunnel enabling network connectivity between a content creation device and content creation software running on the application server according to some examples.

FIG. 2 is a diagram illustrating a workflow for configuring an on-premises router, a virtual router, and an application server running in a virtual private cloud of a cloud provider network to establish a virtual private network (VPN) tunnel and a virtual eXtensible local area network (VXLAN) tunnel enabling network connectivity between a content creation device and content creation software running on the application server according to some examples according to some examples. The process 200 described in FIG. 2, for example, illustrates some additional details of the process described in relation to FIG. 1 connecting a content creation device 110 to content creation software 118.

The process 200 includes, for example, at 202, configuring a secure VPN tunnel endpoint at an on-premises router 114 located in a user's computing environment. As indicated above, in some examples, the configuration of a VPN tunnel endpoint at an on-premises router 114 can include using configuration data, scripts, or other data generated by a configuration service 122 of a cloud provider network 100.

In some examples, at 204, the corresponding endpoint of the secure VPN tunnel is configured at a virtual router 130. In some examples, the configuration service 122 can automatically generate the tunnel endpoint as part of launching the virtual router 130 into a user's VPC containing a computing resource hosting content creation software. In some examples, at 206, the virtual router 130 or other resource generates a public/private key pair for encrypting network traffic traversing the secure VPN tunnel. At 208, the encryption keys are provided to each of the router 114 and the virtual router 130. At 210, firewall rules on each side of the connection can be optionally configured and confirmed to ensure that traffic is permitted to traverse the route from a content creation device 110 to a virtual machine 120 or other resource hosting content creation software 118 and, at 212, network routes are configured to ensure that the traffic is routed appropriated. Further optionally, at 214, any reverse path forwarding (RPF) rules associated with the virtual router 130 are disabled to ensure that the traffic traversing the network path is not inadvertently dropped.

In some examples, at 216, a VXLAN tunnel endpoint is configured at an on-premises router 114 (e.g., using configuration data 132 or other processes) and, at 218, the VXLAN is added to a bridge on the on-premises router 114. In some examples, at 220, a corresponding VXLAN endpoint is configured at the virtual machine 120 or other computing resource hosting content creation software 118 (e.g., by the configuration service 122). In some examples, at 222, the configuration service 122 optionally disables any firewall rules associated with the VPC 108 preventing traffic from traversing the configured network tunnels. In some examples, at 224, the configuration service 122 further configures a loopback interface at the application server (e.g., the virtual machine 120 or other computing resource in the VPC 108). At 226, in some examples, the configuration service 122 adds a route from the virtual router 130 to the virtual machine 120 (or other computing resource hosting the content creation software 118).

Figure 3:
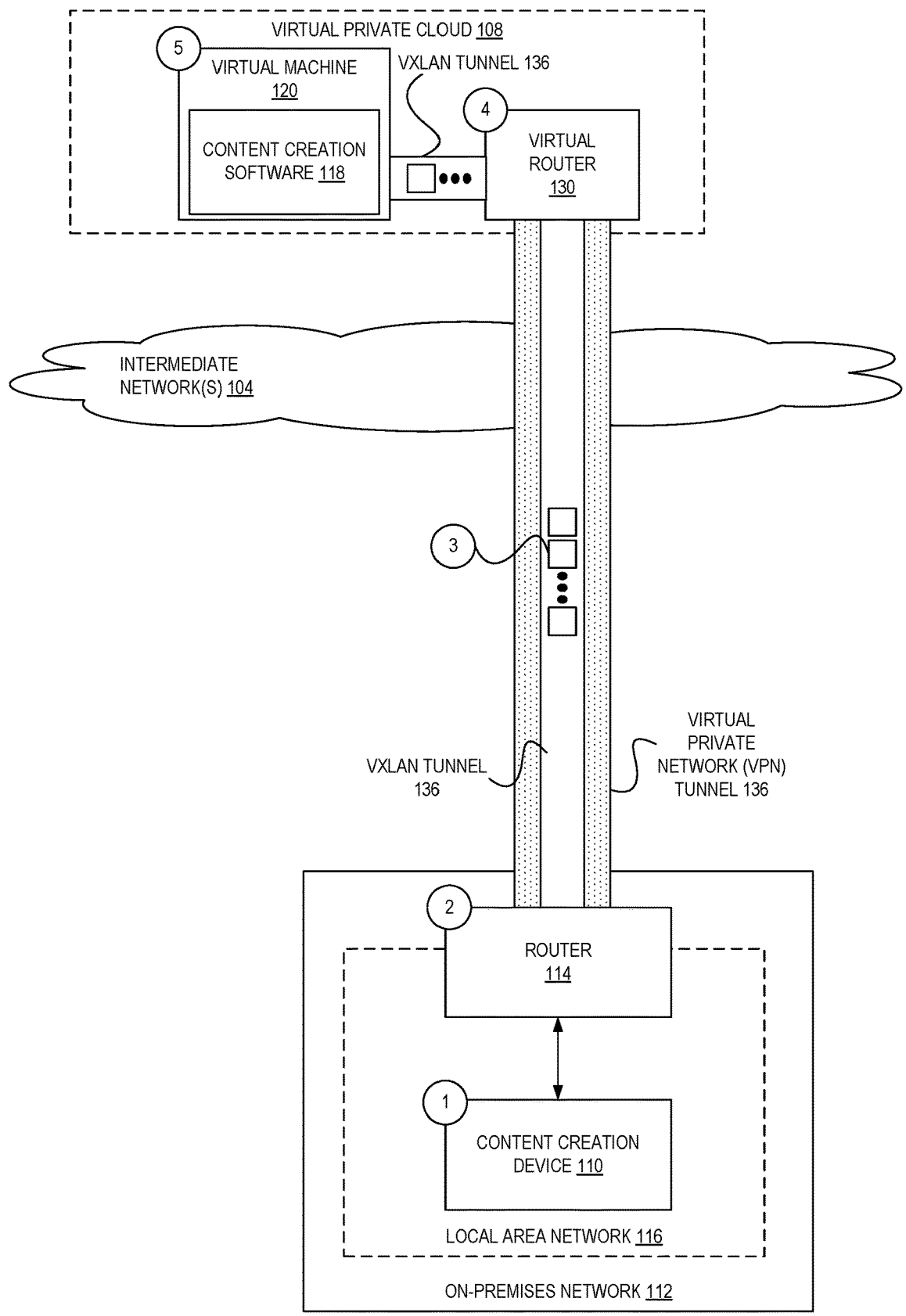
FIG. 3 is a diagram illustrating an example of network traffic traversing a configured VPN/VXLAN tunnel connecting an on-premises content creation device with content creation software running in a cloud provider network according to some examples.

FIG. 3 is a diagram illustrating an example of network traffic traversing a configured VPN/VXLAN tunnel connecting an on-premises content creation device with content creation software running in a cloud provider network according to some examples. As shown in FIG. 3, at circle "1," the initial routing of one or more multicast packets (e.g., as part of a mDNS request) from a content creation device to a local router (e.g., router 114). At circle "2," the network packets are first encapsulated by the on-premises router 114 based on the configured VXLAN tunnel settings. The network packets are further encapsulated using the secure VPN protocol associated with the secure VPN tunnel. At circle "3," the on-premises router 114 then sends the network packets encapsulated in accordance with the VXLAN tunnel 126 and VPN tunnel 128 to a virtual router 130 across intermediate network(s) 104 using TCP/IP protocols.

In some examples, at circle "4" in FIG. 3, the virtual router 130 receiving the network traffic decapsulates the secure VPN tunnel 128 encapsulation. The VXLAN tunnel 126 is then used to further route the network traffic to a virtual machine 120 hosting content creation software 118. In some examples, at circle "5," the virtual machine 120 decapsulates the VXLAN network traffic to obtain the mDNS packets and the mDNS packets are then sent to the virtual machine 120 application hardware drivers.

In some examples, the virtual machine 120 application hardware drivers in the virtual private cloud 108 then generate mDNS packets and encapsulate the mDNS packets for VXLAN traversal to the virtual router 130. The virtual router 130 then encapsulates the mDNS packets using the secure VPN protocol associated with the secure VPN tunnel. The virtual router 130 routes the mDNS packets over the intermediate network(s) 104 to the on-premises router 114. The router 114 then decapsulates the mDNS packets using the secure VPN tunnel 128 protocol and further decapsulates the network packets based on the VXLAN tunnel 126 protocol. In some examples, the on-premises router 114 then routes the network packets to the content creation hardware 110.

Figure 4:
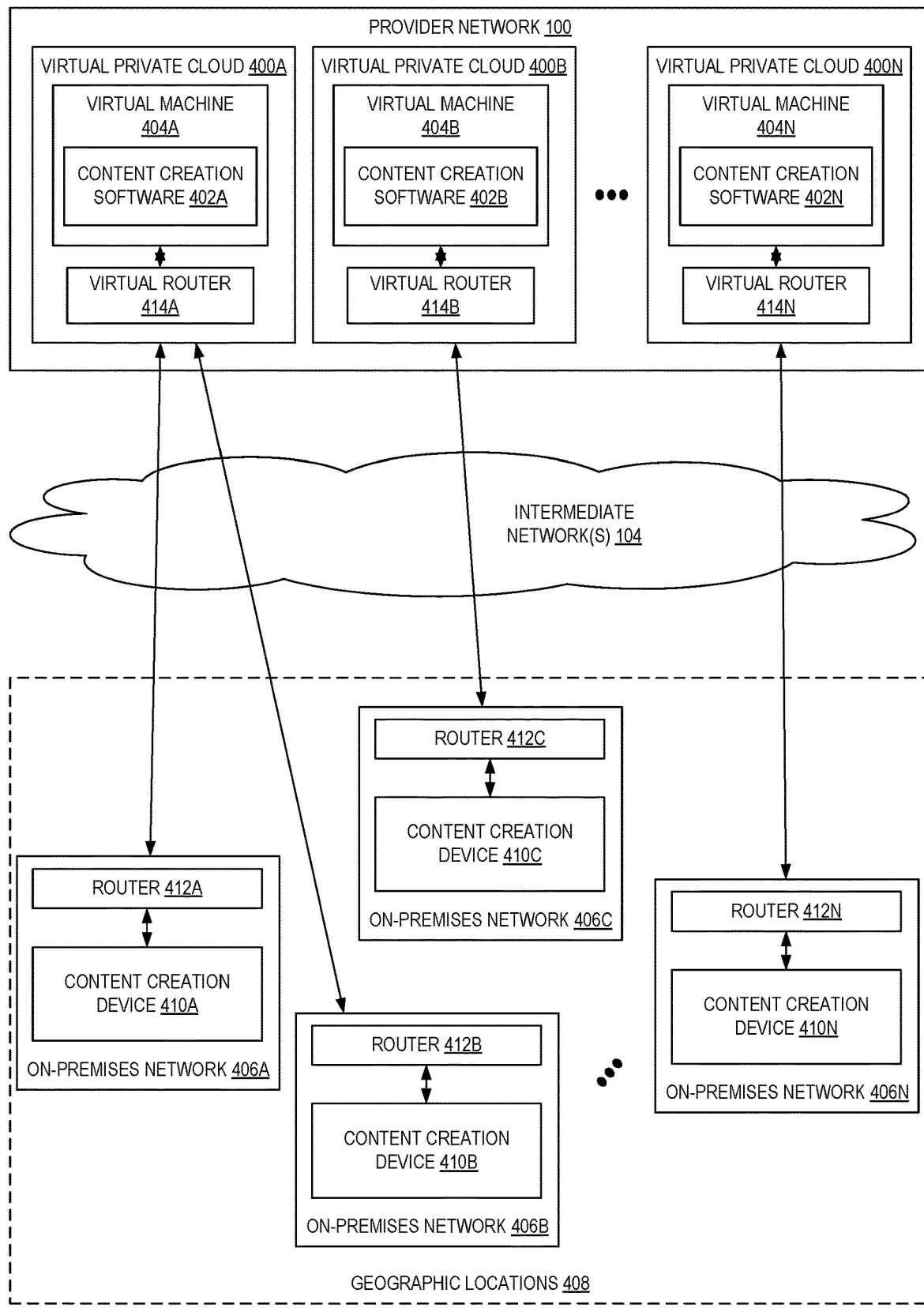
FIG. 4 is a diagram illustrating an example of the use of configured VPN/VXLAN tunnels connecting on-premises content creation device at distributed geographic locations with content creation software running in a cloud provider network according to some examples.

FIG. 4 is a diagram illustrating an example of the use of configured VPN/VXLAN tunnels connecting on-premises content creation device at distributed geographic locations with content creation software running in a cloud provider network according to some examples. As shown in FIG. 4, a cloud provider network 100 includes any number of virtual private clouds (e.g., a virtual private cloud 400A, virtual private cloud 400B, . . . , virtual private cloud 400N) associated with one or more user accounts of the provider network. In the context of the processes described herein, the user accounts can be associated with any number of professionals and other users making use of content creation software (e.g., content creation software 402A, content creation software 402B, . . . , content creation software 402N running on virtual machine 404A, virtual machine 404B, . . . , virtual machine 404N, respectively) as part of various audiovisual content creation processes. Some of the users may be working individually while others may be working collaboratively using the computing resources hosted in the provider network 100. For example, a mixer can be working at on-premises network 406A using a content creation device 410A while a recording stage at on-premises network 406B, at a different geographic location, can be using a content creation device 410B to collaborate using the content creation software 402A.

In some examples, the resources hosted in the provider network can be used by any number of users using resources on on-premises network (e.g., on-premises network 406A, on-premises network 406B, on-premises network 406C, . . . , on-premises network 406N), which can be distributed across several possibly independent geographic locations 408. At each of these locations, for example, users can be using one or more content creation devices (e.g., content creation device 410A, content creation device 410B, content creation device 410C, . . . , content creation device 410N). As shown, each of the users in these environments can readily interface with content creation software running in the cloud provider network 100 using the VPN/VXLAN tunnels described herein via on-premises routers (e.g., router 412A, router 412B, router 412C, . . . , router 412N) and virtual routers (e.g., virtual router 414A, virtual router 414B, . . . , virtual router 414N).

Figure 5:
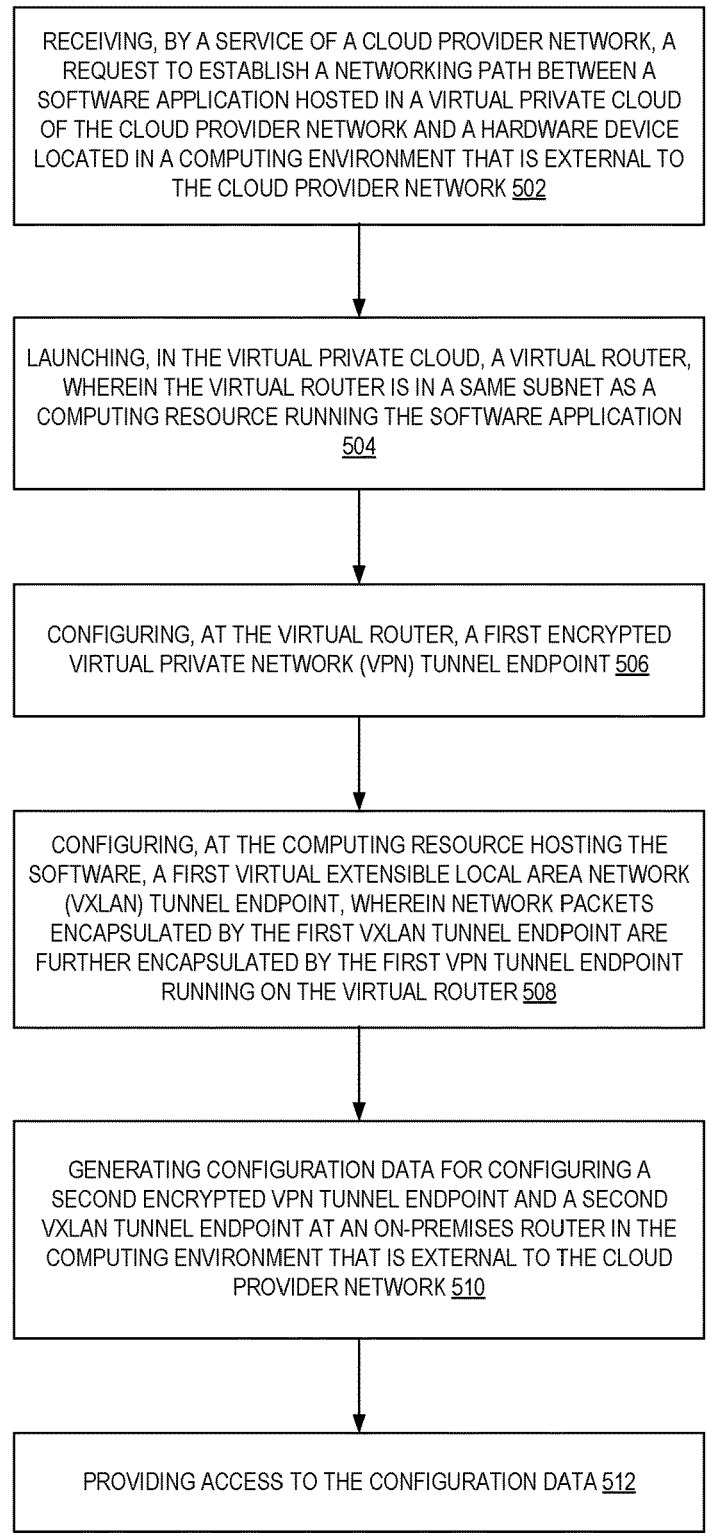
FIG. 5 is a flow diagram illustrating operations of a method for enabling content creation devices on a local Internet Protocol (IP) subnet range to establish secure network connections with and to communicate with content creation software running on a remote server in a virtual private cloud of a cloud provider network according to some examples.

FIG. 5 is a flow diagram illustrating operations 500 of a method is a flow diagram illustrating operations of a method for enabling content creation devices on a local Internet Protocol (IP) subnet range to establish secure network connections with and to communicate with content creation software running on a remote server in a virtual private cloud of a cloud provider network according to some examples. Some or all the operations 500 (or other processes described herein, or variations, and/or combinations thereof) are performed under the control of one or more computer systems configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 500 are performed by a media and entertainment application service 124 of the other figures.

The operations 500 include, at block 502, receiving, by a service of a cloud provider network, a request to establish a networking path between a software application hosted in a virtual private cloud of the cloud provider network and a hardware device located in a computing environment that is external to the cloud provider network.

The operations 500 further include, at block 504, launching, in the virtual private cloud, a virtual router, wherein the virtual router is in a same subnet as a computing resource running the software application.

The operations 500 further include, at block 506, configuring, at the virtual router, a first encrypted virtual private network (VPN) tunnel endpoint.

The operations 500 further include, at block 508, configuring, at the computing resource hosting the software, a first Virtual eXtensible Local Area Network (VXLAN) tunnel endpoint, wherein network packets encapsulated by the first VXLAN tunnel endpoint are further encapsulated by the first VPN tunnel endpoint running on the virtual router.

The operations 500 further include, at block 510, generating configuration data for configuring a second encrypted VPN tunnel endpoint and a second VXLAN tunnel endpoint at an on-premises router in the computing environment that is external to the cloud provider network.

The operations 500 further include, at block 512, providing access to the configuration data.

In some examples, the operations 500 further include receiving, by the virtual router, network traffic associated with a multicast Domain Name Services (mDNS) request used by the hardware device to discover the software application; decapsulating the network traffic using an encrypted VPN protocol associated with the first VPN tunnel endpoint to obtain unencrypted network traffic; and routing, to the computing resource running the software application, the unencrypted network traffic via a VXLAN tunnel associated with the first VXLAN tunnel endpoint.

In some examples, the configuration data includes at least one of: a configuration file executable by the on-premises router, an executable file for execution in the computing environment, instructions executable by a software agent running in the computing environment, or data describing operations for configuring the on-premises router.

In some examples, the operations further include launching, in the virtual cloud, the computing resource running the software application.

In some examples, the request identifies a type of the on-premises router in the computing environment that is external to the cloud provider network, and wherein the configuration data includes at least one configuration that is specific to the type of the on-premises router.

In some examples, the operations further include generating a public/private key pair to be used by the first secure VPN tunnel endpoint and the second secure VPN tunnel endpoint, wherein a public key of the public/private key pair is included in the configuration data.

In some examples, the operations further include configuring a firewall rule permitting network traffic originating from the on-premises router to traverse between the virtual router and the computing resource running the software application.

In some examples, the operations further include disabling reverse path forwarding checking for the virtual router, wherein the reverse path forwarding checking, when enabled, causes the virtual router to drop network traffic not destined for or originating from the virtual router.

In some examples, the operations further include the software application is content creation software, and wherein the hardware device is a content creation device that interfaces with the content creation software.

In some examples, the operations further include the service of the cloud provider network establishes networking paths between a plurality of virtual private clouds including the virtual private cloud and a plurality of computing environments including the computing environment.

In some examples, the operations further include configuring a loopback interface at the computing resource running the software application.

Figure 6:
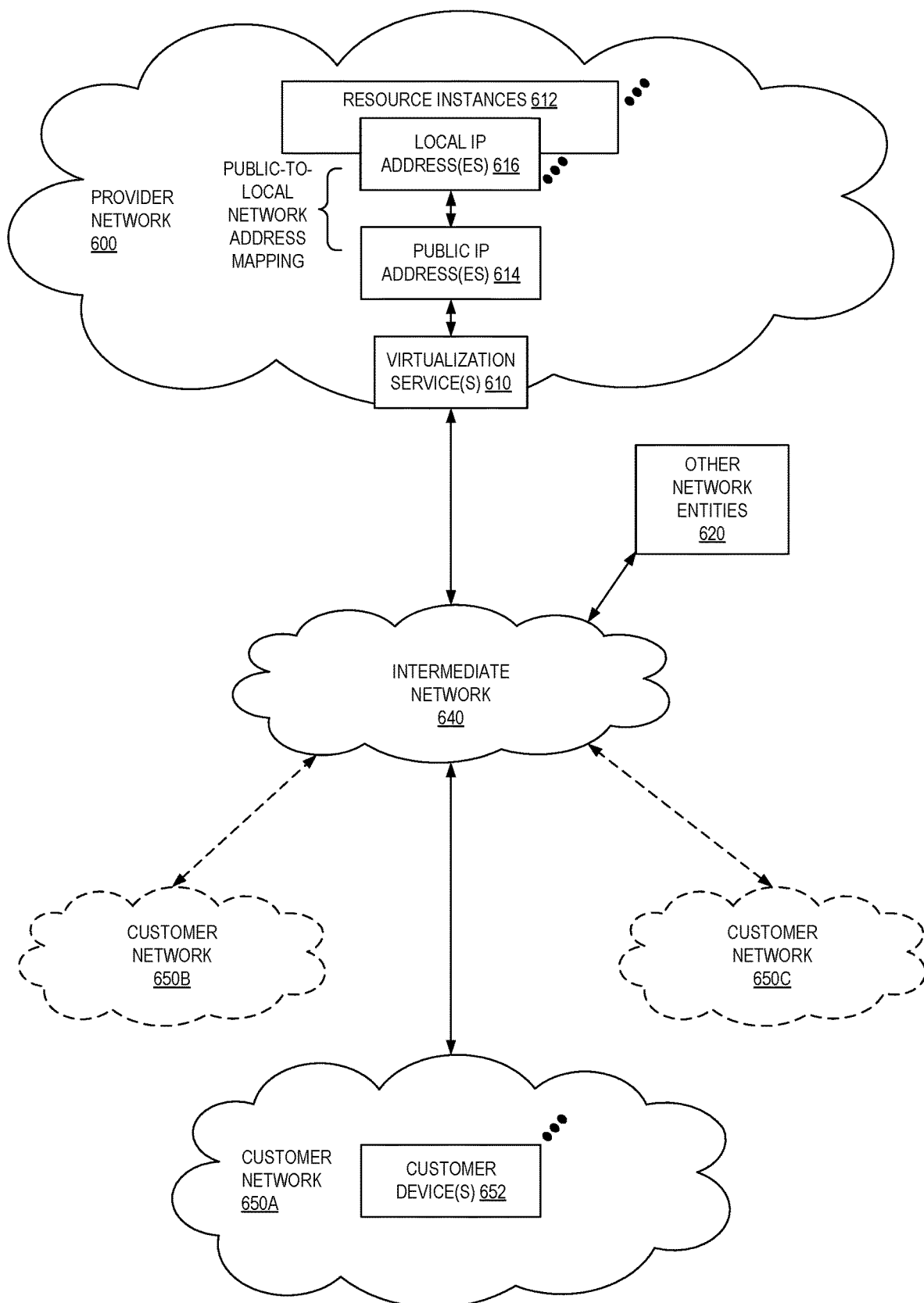
FIG. 6 illustrates an example provider network environment according to some examples.

FIG. 6 illustrates an example provider network (or "service provider system") environment according to some examples. A provider network 600 can provide resource virtualization to customers via one or more virtualization services 610 that allow customers to purchase, rent, or otherwise obtain instances 612 of virtualized resources, including but not limited to computation and storage resources, implemented on devices within the provider network or networks in one or more data centers. Local Internet Protocol (IP) addresses 616 can be associated with the resource instances 612; the local IP addresses are the internal network addresses of the resource instances 612 on the provider network 600. In some examples, the provider network 600 can also provide public IP addresses 614 and/or public IP address ranges (e.g., Internet Protocol version 4 (IPv4) or Internet Protocol version 6 (IPv6) addresses) that customers can obtain from the provider 600.

Conventionally, the provider network 600, via the virtualization services 610, can allow a customer of the service provider (e.g., a customer that operates one or more customer networks 650A-650C (or "client networks") including one or more customer device(s) 652) to dynamically associate at least some public IP addresses 614 assigned or allocated to the customer with particular resource instances 612 assigned to the customer. The provider network 600 can also allow the customer to remap a public IP address 614, previously mapped to one virtualized computing resource instance 612 allocated to the customer, to another virtualized computing resource instance 612 that is also allocated to the customer. Using the virtualized computing resource instances 612 and public IP addresses 614 provided by the service provider, a customer of the service provider such as the operator of the customer network(s) 650A-650C can, for example, implement customer-specific applications and present the customer's applications on an intermediate network 640, such as the Internet. Other network entities 620 on the intermediate network 640 can then generate traffic to a destination public IP address 614 published by the customer network(s) 650A-650C; the traffic is routed to the service provider data center, and at the data center is routed, via a network substrate, to the local IP address 616 of the virtualized computing resource instance 612 currently mapped to the destination public IP address 614. Similarly, response traffic from the virtualized computing resource instance 612 can be routed via the network substrate back onto the intermediate network 640 to the source entity 620.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 600; a customer can then assign their allocated public IP addresses to particular resource instances allocated to the customer. These public IP addresses can be referred to as customer public IP addresses, or simply customer IP addresses. Instead of being assigned by the provider network 600 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 7:
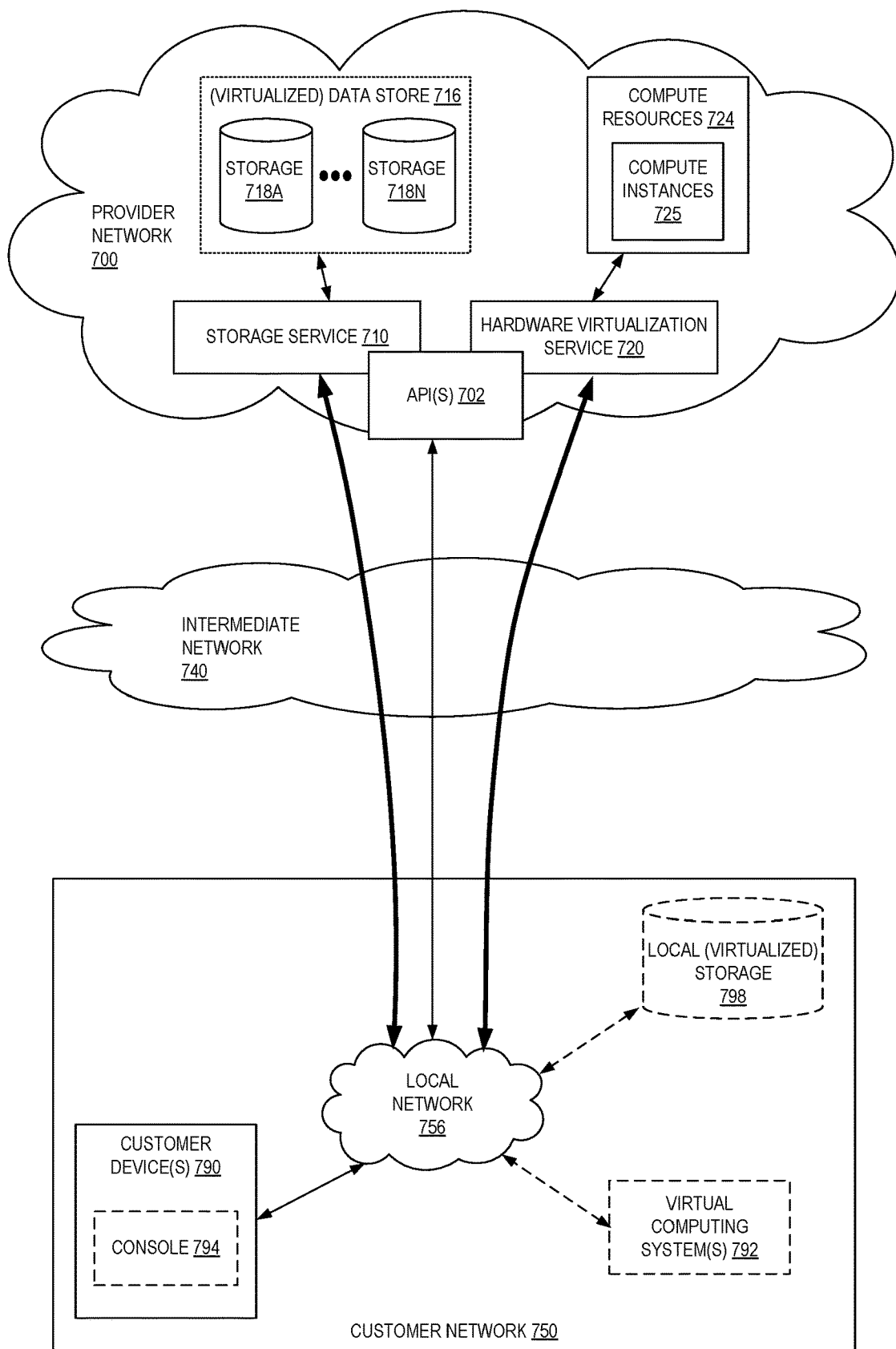
FIG. 7 is a block diagram of an example provider network that provides a storage service and a hardware virtualization service to customers according to some examples.

FIG. 7 is a block diagram of an example provider network environment that provides a storage service and a hardware virtualization service to customers, according to some examples. A hardware virtualization service 720 provides multiple compute resources 724 (e.g., compute instances 725, such as VMs) to customers. The compute resources 724 can, for example, be provided as a service to customers of a provider network 700 (e.g., to a customer that implements a customer network 750). Each computation resource 724 can be provided with one or more local IP addresses. The provider network 700 can be configured to route packets from the local IP addresses of the compute resources 724 to public Internet destinations, and from public Internet sources to the local IP addresses of the compute resources 724.

The provider network 700 can provide the customer network 750, for example coupled to an intermediate network 740 via a local network 756, the ability to implement virtual computing systems 792 via the hardware virtualization service 720 coupled to the intermediate network 740 and to the provider network 700. In some examples, the hardware virtualization service 720 can provide one or more APIs 702, for example a web services interface, via which the customer network 750 can access functionality provided by the hardware virtualization service 720, for example via a console 794 (e.g., a web-based application, standalone application, mobile application, etc.) of a customer device 790. In some examples, at the provider network 700, each virtual computing system 792 at the customer network 750 can correspond to a computation resource 724 that is leased, rented, or otherwise provided to the customer network 750.

From an instance of the virtual computing system(s) 792 and/or another customer device 790 (e.g., via console 794), the customer can access the functionality of a storage service 710, for example via the one or more APIs 702, to access data from and store data to storage resources 718A-718N of a virtual data store 716 (e.g., a folder or "bucket," a virtualized volume, a database, etc.) provided by the provider network 700. In some examples, a virtualized data store gateway (not shown) can be provided at the customer network 750 that can locally cache at least some data, for example frequently accessed or critical data, and that can communicate with the storage service 710 via one or more communications channels to upload new or modified data from a local cache so that the primary store of data (the virtualized data store 716) is maintained. In some examples, a user, via the virtual computing system 792 and/or another customer device 790, can mount and access virtual data store 716 volumes via the storage service 710 acting as a storage virtualization service, and these volumes can appear to the user as local (virtualized) storage 798.

While not shown in FIG. 7, the virtualization service(s) can also be accessed from resource instances within the provider network 700 via the API(s) 702. For example, a customer, appliance service provider, or other entity can access a virtualization service from within a respective virtual network on the provider network 700 via the API(s) 702 to request allocation of one or more resource instances within the virtual network or within another virtual network.

Figure 8:
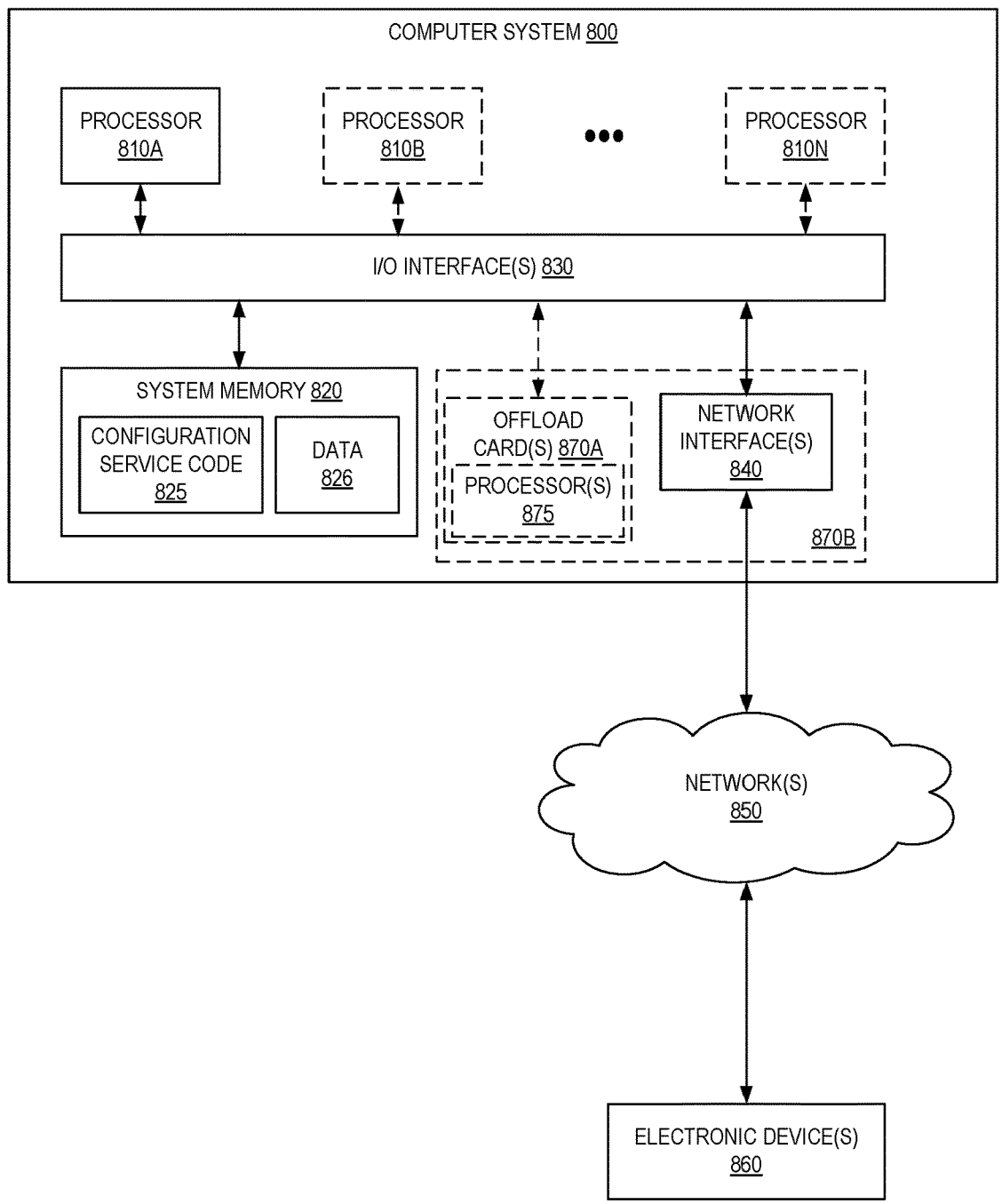
FIG. 8 is a block diagram illustrating an example computer system that can be used in some examples.

In some examples, a system that implements a portion or all of the techniques described herein can include a general-purpose computer system, such as the computer system 800 illustrated in FIG. 8, that includes, or is configured to access, one or more computer-accessible media. In the illustrated example, the computer system 800 includes one or more processors 810 coupled to a system memory 820 via an input/output (I/O) interface 830. The computer system 800 further includes a network interface 840 coupled to the I/O interface 830. While FIG. 8 shows the computer system 800 as a single computing device, in various examples the computer system 800 can include one computing device or any number of computing devices configured to work together as a single computer system 800.

In various examples, the computer system 800 can be a uniprocessor system including one processor 810, or a multiprocessor system including several processors 810 (e.g., two, four, eight, or another suitable number). The processor(s) 810 can be any suitable processor(s) capable of executing instructions. For example, in various examples, the processor(s) 810 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 810 can commonly, but not necessarily, implement the same ISA.

The system memory 820 can store instructions and data accessible by the processor(s) 810. In various examples, the system memory 820 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 820 as media and entertainment applications service code 825 (e.g., executable to implement, in whole or in part, the media and entertainment applications service 124) and data 826.

In some examples, the I/O interface 830 can be configured to coordinate I/O traffic between the processor 810, the system memory 820, and any peripheral devices in the device, including the network interface 840 and/or other peripheral interfaces (not shown). In some examples, the I/O interface 830 can perform any necessary protocol, timing, or other data transformations to convert data signals from one component (e.g., the system memory 820) into a format suitable for use by another component (e.g., the processor 810). In some examples, the I/O interface 830 can include support for devices attached through various types of peripheral buses, such as a variant of the Peripheral Component Interconnect (PCI) bus standard or the Universal Serial Bus (USB) standard, for example. In some examples, the function of the I/O interface 830 can be split into two or more separate components, such as a north bridge and a south bridge, for example. Also, in some examples, some or all of the functionality of the I/O interface 830, such as an interface to the system memory 820, can be incorporated directly into the processor 810.

The network interface 840 can be configured to allow data to be exchanged between the computer system 800 and other devices 860 attached to a network or networks 850, such as other computer systems or devices as illustrated in FIG. 1, for example. In various examples, the network interface 840 can support communication via any suitable wired or wireless general data networks, such as types of Ethernet network, for example. Additionally, the network interface 840 can support communication via telecommunications/telephony networks, such as analog voice networks or digital fiber communications networks, via storage area networks (SANs), such as Fibre Channel SANs, and/or via any other suitable type of network and/or protocol.

In some examples, the computer system 800 includes one or more offload cards 870A or 870B (including one or more processors 875, and possibly including the one or more network interfaces 840) that are connected using the I/O interface 830 (e.g., a bus implementing a version of the Peripheral Component Interconnect-Express (PCI-E) standard, or another interconnect such as a QuickPath interconnect (QPI) or UltraPath interconnect (UPI)). For example, in some examples the computer system 800 can act as a host electronic device (e.g., operating as part of a hardware virtualization service) that hosts compute resources such as compute instances, and the one or more offload cards 870A or 870B execute a virtualization manager that can manage compute instances that execute on the host electronic device. As an example, in some examples the offload card(s) 870A or 870B can perform compute instance management operations, such as pausing and/or un-pausing compute instances, launching and/or terminating compute instances, performing memory transfer/copying operations, etc. These management operations can, in some examples, be performed by the offload card(s) 870A or 870B in coordination with a hypervisor (e.g., upon a request from a hypervisor) that is executed by the other processors 810A-810N of the computer system 800. However, in some examples the virtualization manager implemented by the offload card(s) 870A or 870B can accommodate requests from other entities (e.g., from compute instances themselves), and cannot coordinate with (or service) any separate hypervisor.

In some examples, the system memory 820 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computer system 800 via the I/O interface 830. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computer system 800 as the system memory 820 or another type of memory. Further, a computer-accessible medium can include transmission media or signals such as electrical, electromagnetic, or digital signals, conveyed via a communication medium such as a network and/or a wireless link, such as can be implemented via the network interface 840.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 718A-718N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for the nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving, by a media and entertainment applications service of a cloud provider network, a request to establish a networking path between a content creation software application hosted in a virtual private cloud of the cloud provider network and a hardware device located in a computing environment that is external to the cloud provider network, wherein the hardware device interfaces with the content creation software application, and wherein the hardware device uses multicast Domain Name Services (mDNS) queries to discover instances of the content creation software application;
launching, in the virtual private cloud, a computing resource running the content creation software application;
launching, in the virtual private cloud, a virtual router, wherein the virtual router is in a same subnet as the computing resource running the content creation software application;

configuring, at the virtual router, a first encrypted virtual private network (VPN) tunnel endpoint, wherein the first encrypted VPN tunnel endpoint includes: a first interface for a private network including the computing resource hosting the content creation software application in the virtual private cloud, and a second interface for a public network used to communicate with an on-premises router in the computing environment that is external to the cloud provider network;

configuring, at the computing resource hosting the content creation software application, a first Virtual eXtensible Local Area Network (VXLAN) tunnel endpoint, wherein network packets encapsulated by the first VXLAN tunnel endpoint are further encapsulated by the first VPN tunnel endpoint running on the virtual router;

generating configuration data for configuring a second encrypted VPN tunnel endpoint and a second VXLAN tunnel endpoint at the on-premises router in the computing environment that is external to the cloud provider network; and providing access to the configuration data.

2. The computer-implemented method of claim 1, further comprising:
receiving, by the virtual router, a multicast packet associated with a multicast Domain Name Services (mDNS) request used by the content creation device to discover the content creation software application;
decapsulating the multicast packet using an encrypted VPN protocol associated with the first VPN tunnel endpoint to obtain unencrypted network traffic; and
routing, to the computing resource running the content creation software application, the unencrypted network traffic via a VXLAN tunnel associated with the first VXLAN tunnel endpoint.

3. The computer-implemented method of claim 1, wherein the configuration data includes at least one of: a configuration file executable by the on-premises router, an executable file for execution in the computing environment, instructions executable by a software agent running in the computing environment, or data describing operations for configuring the on-premises router.

4. A computer-implemented method comprising:
receiving, by a service of a cloud provider network, a request to establish a networking path between a software application hosted in a virtual private cloud of the cloud provider network and a hardware device located in a computing environment that is external to the cloud provider network;
launching, in the virtual private cloud, a virtual router, wherein the virtual router is in a same subnet as a computing resource running the software application;
configuring, at the virtual router, a first encrypted virtual private network (VPN) tunnel endpoint;
configuring, at the computing resource hosting the software application, a first Virtual eXtensible Local Area Network (VXLAN) tunnel endpoint, wherein network packets encapsulated by the first VXLAN tunnel endpoint are further encapsulated by the first VPN tunnel endpoint running on the virtual router;
generating configuration data for configuring a second encrypted VPN tunnel endpoint and a second VXLAN tunnel endpoint at an on-premises router in the computing environment that is external to the cloud provider network; and
providing access to the configuration data.

5. The computer-implemented method of claim 4, further comprising:
receiving, by the virtual router, network traffic associated with a multicast Domain Name Services (mDNS) request used by the hardware device to discover the software application;
decapsulating the network traffic using an encrypted VPN protocol associated with the first VPN tunnel endpoint to obtain unencrypted network traffic; and
routing, to the computing resource running the software application, the unencrypted network traffic via a VXLAN tunnel associated with the first VXLAN tunnel endpoint.

6. The computer-implemented method of claim 4, wherein the configuration data includes at least one of: a configuration file executable by the on-premises router, an executable file for execution in the computing environment, instructions executable by a software agent running in the computing environment, or data describing operations for configuring the on-premises router.

7. The computer-implemented method of claim 4, further comprising launching, in the virtual cloud, the computing resource running the software application.

8. The computer-implemented method of claim 4, wherein the request identifies a type of the on-premises router in the computing environment that is external to the cloud provider network, and wherein the configuration data includes at least one configuration that is specific to the type of the on-premises router.

9. The computer-implemented method of claim 4, further comprising generating a public/private key pair to be used by the first encrypted VPN tunnel endpoint and the second encrypted VPN tunnel endpoint, wherein a public key of the public/private key pair is included in the configuration data.

10. The computer-implemented method of claim 4, further comprising configuring a firewall rule permitting network traffic originating from the on-premises router to traverse between the virtual router and the computing resource running the software application.

11. The computer-implemented method of claim 4, further comprising disabling reverse path forwarding checking for the virtual router, wherein the reverse path forwarding checking, when enabled, causes the virtual router to drop network traffic not destined for or originating from the virtual router.

12. The computer-implemented method of claim 4, wherein the software application is content creation software, and wherein the hardware device is a content creation device that interfaces with the content creation software.

13. The computer-implemented method of claim 4, wherein the service of the cloud provider network establishes networking paths between a plurality of virtual private clouds including the virtual private cloud and a plurality of computing environments including the computing environment.

14. The computer-implemented method of claim 4, further comprising configuring a loopback interface at the computing resource running the software application.

15. A system comprising:
a first one or more electronic devices to implement a media and entertainment applications service in a multi-tenant provider network, wherein the media and entertainment applications service includes instructions that upon execution cause the media and entertainment applications service to:
receive a request to establish a networking path between a software application hosted in a virtual private cloud of the multi-tenant provider network and a hardware device located in a computing environment that is external to the multi-tenant provider network, launch, in the virtual private cloud, a virtual router, wherein the virtual router is in a same subnet as a computing resource running the software application, configure, at the virtual router, a first encrypted virtual private network (VPN) tunnel endpoint, configure, at the computing resource hosting the software application, a first Virtual eXtensible Local Area Network (VXLAN) tunnel endpoint, wherein network packets encapsulated by the first VXLAN tunnel endpoint are further encapsulated by the first VPN tunnel endpoint running on the virtual router, generate configuration data for configuring a second encrypted VPN tunnel endpoint and a second VXLAN tunnel endpoint at an on-premises router in the computing environment that is external to the cloud provider network; and provide access to the configuration data; and a second one or more electronic devices to implement a hardware virtualization service in the multi-tenant provider network, wherein the hardware virtualization service include instructions that upon execution cause the hardware virtualization service to:

launch, in the virtual private cloud, a computing resource running the software application, and launch, in the virtual private cloud, the virtual router, wherein the virtual router is in a same subnet as the computing resource running the software application.

16. The system of claim 15, wherein the media and entertainment applications service further includes instructions that, upon execution, further cause the media and entertainment applications service to:

receive, by the virtual router, network traffic associated with a multicast Domain Name Services (mDNS) request used by the hardware device to discover the software application;

decapsulate the network traffic using an encrypted VPN protocol associated with the first VPN tunnel endpoint to obtain unencrypted network traffic; and route, to the computing resource running the software application, the unencrypted network traffic via a VXLAN tunnel associated with the first VXLAN tunnel endpoint.

17. The system of claim 15, wherein the configuration data includes at least one of: a configuration file executable by the on-premises router, an executable file for execution in the computing environment, instructions executable by a software agent running in the computing environment, or data describing operations for configuring the on-premises router.

18. The system of claim 15, wherein the media and entertainment applications service further includes instructions that, upon execution, further cause the media and entertainment applications service to: launch, in the virtual cloud, the computing resource running the software application.

19. The system of claim 15, the request identifies a type of the on-premises router in the computing environment that is external to the cloud provider network, and wherein the configuration data includes at least one configuration that is specific to the type of the on-premises router.

20. The system of claim 15, wherein the media and entertainment applications service further includes instructions that, upon execution, further cause the media and entertainment applications service to: generate a public/private key pair to be used by the first encrypted VPN tunnel endpoint and the second encrypted VPN tunnel endpoint, wherein a public key of the public/private key pair is included in the configuration data.

* * * * *